United States Patent [19]
Larochelle et al.

[11] Patent Number: 4,759,717
[45] Date of Patent: Jul. 26, 1988

[54] TEACHING SYSTEM USING COMPUTORS EQUIPPED WITH SCREENS AND CONNECTED IN A CLOSED LOOP WITH A TEACHER CONTROL STATION

[75] Inventors: Francois Larochelle, Prevost; Sylvain Tremblay, Montreal; Jean-Marc Séguin, Repentigny; Etienne Bouchard, Outremont, all of Canada

[73] Assignee: Robotel Electronique, Inc., Montreal, Canada

[21] Appl. No.: 9,247

[22] Filed: Jan. 30, 1987

[51] Int. Cl.⁴ .............................................. G09B 19/00
[52] U.S. Cl. .................................... 434/118; 434/336; 434/350
[58] Field of Search ..................... 434/118, 350, 336

[56] References Cited

U.S. PATENT DOCUMENTS 4,538,993  9/1985  Krumholz ........................... 434/118
4,652,240  3/1987  Wackym ............................. 434/118

Primary Examiner—Leo P. Picard

[57] ABSTRACT

A teaching system comprising student and teacher computer stations which are serially connected in a closed loop circuit. Each student computer and the teacher station comprises a computer device having an associated video monitor connectable thereto via an interface unit. A teacher controller device is provided at the teacher control station and has an output connected to the interface units to transmit an information network signal thereto to condition the interface units to place its associated student computer station to a preselected mode. A keyboard is associated with the controller device at the teacher control station for selecting the mode. A visual display on the controller indicates the selected mode to the teacher.

12 Claims, 6 Drawing Sheets

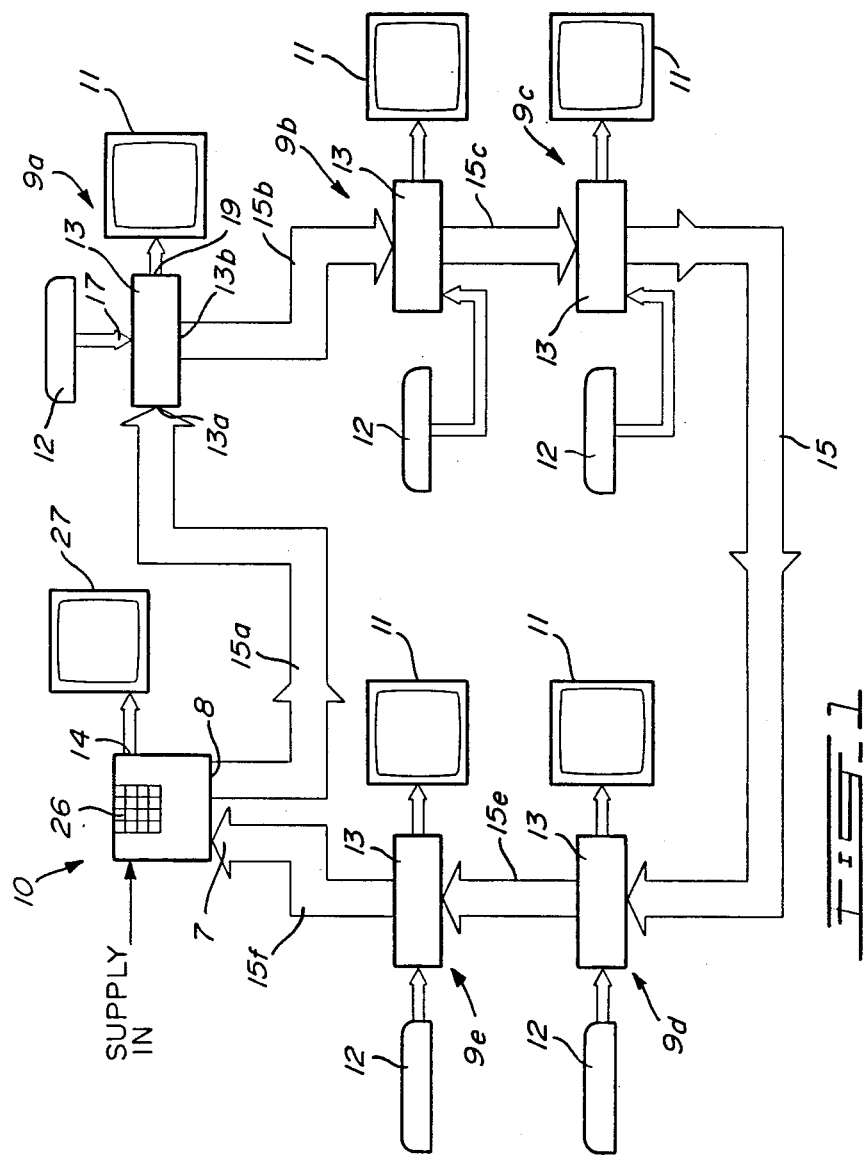

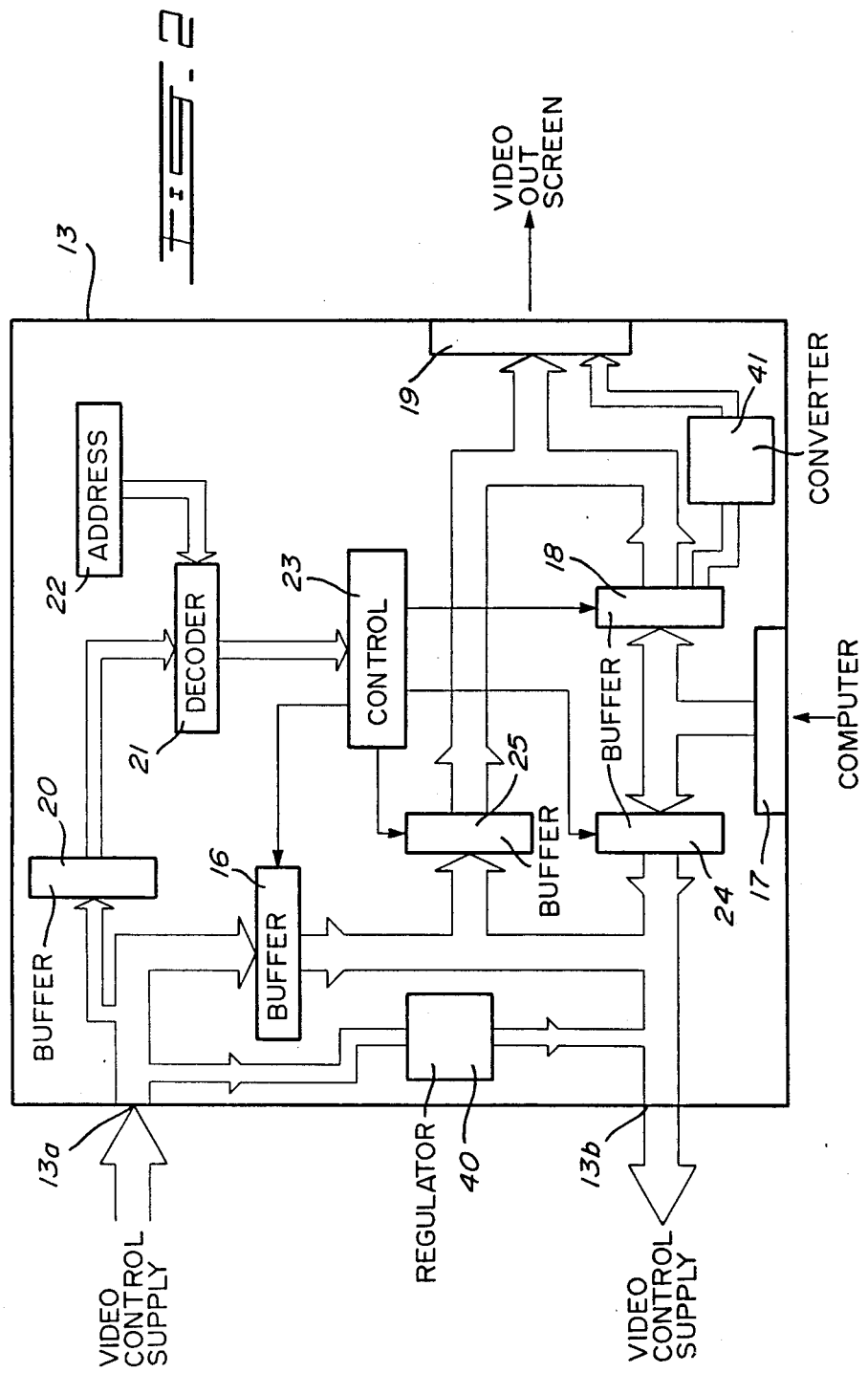

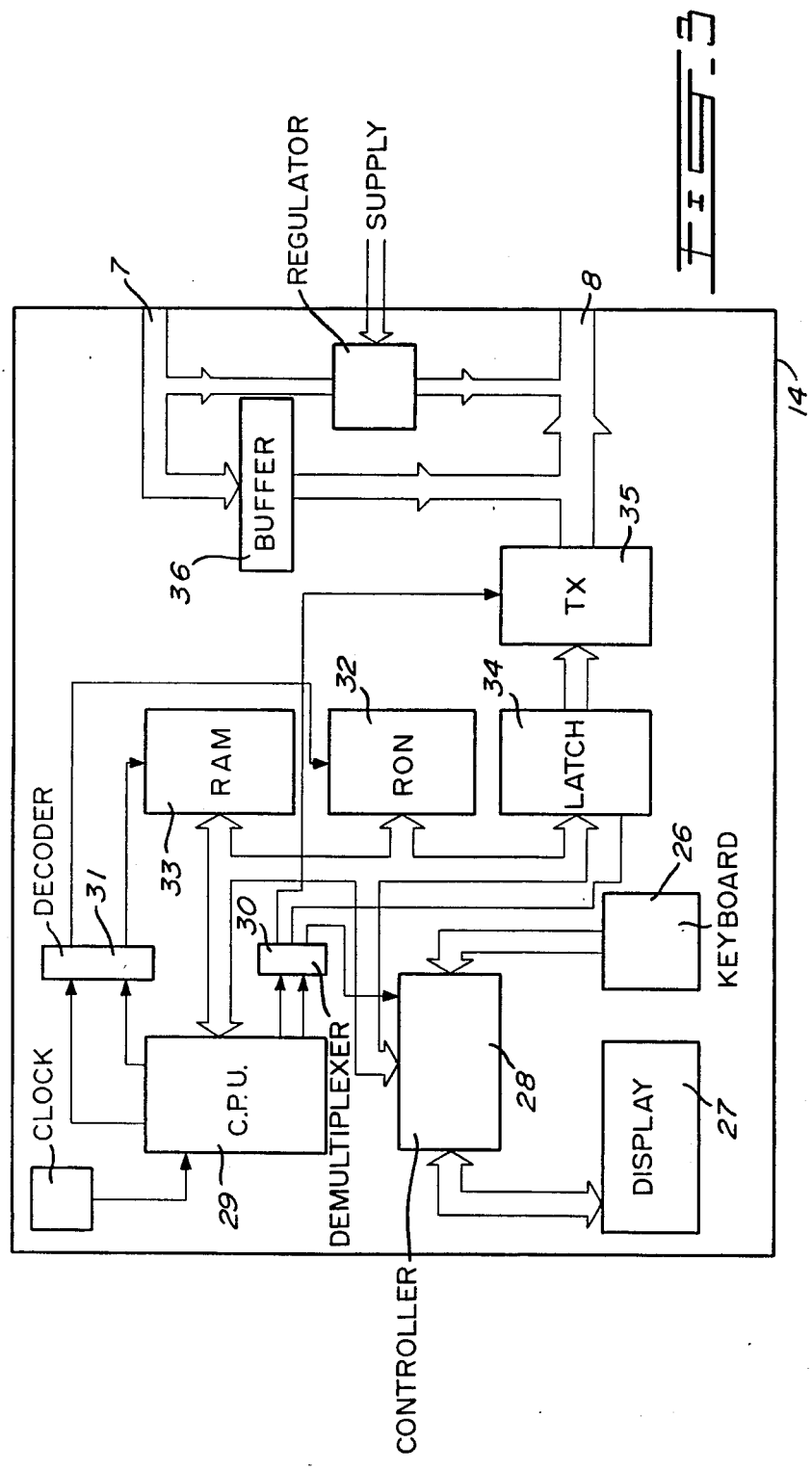

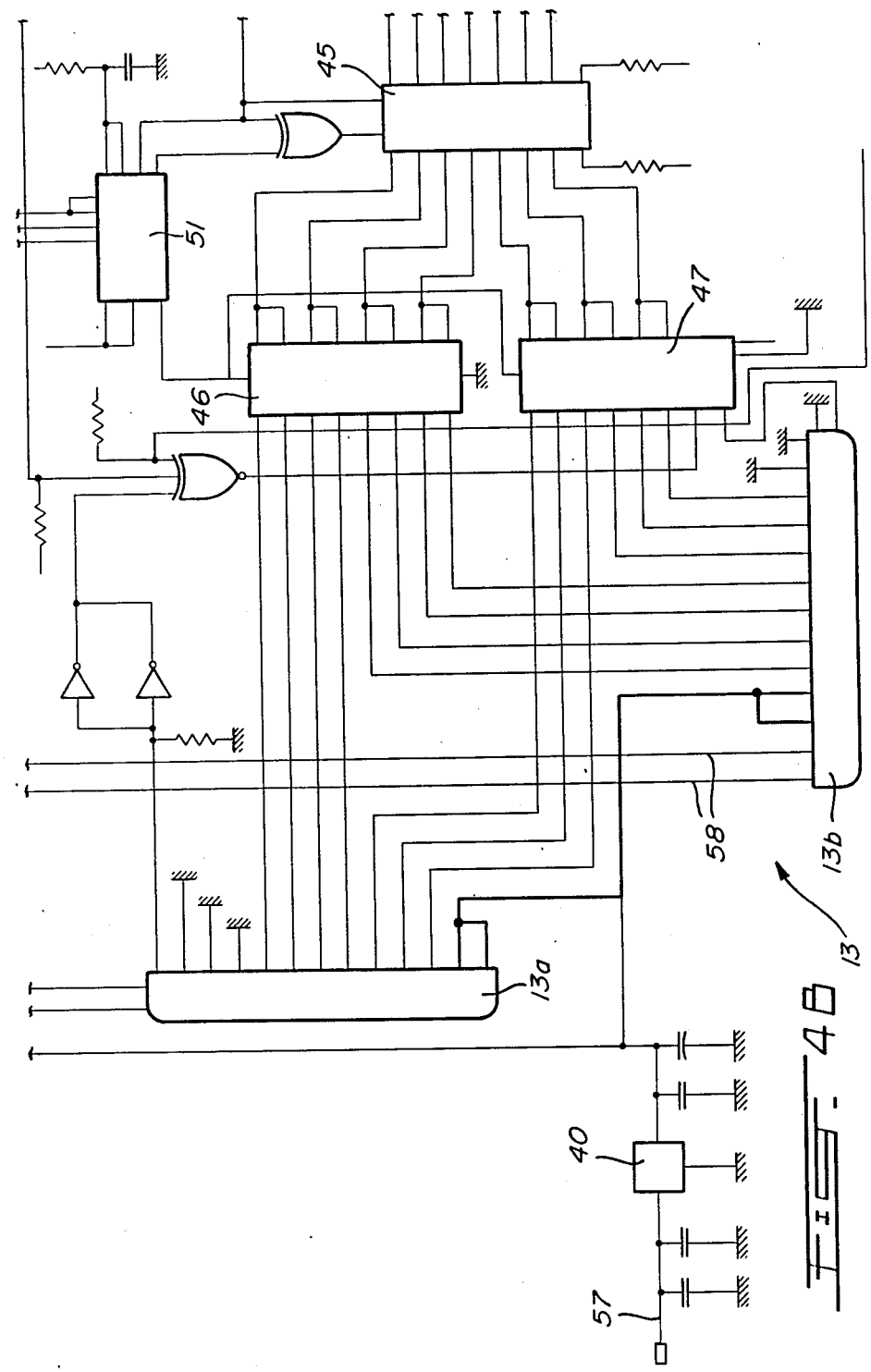

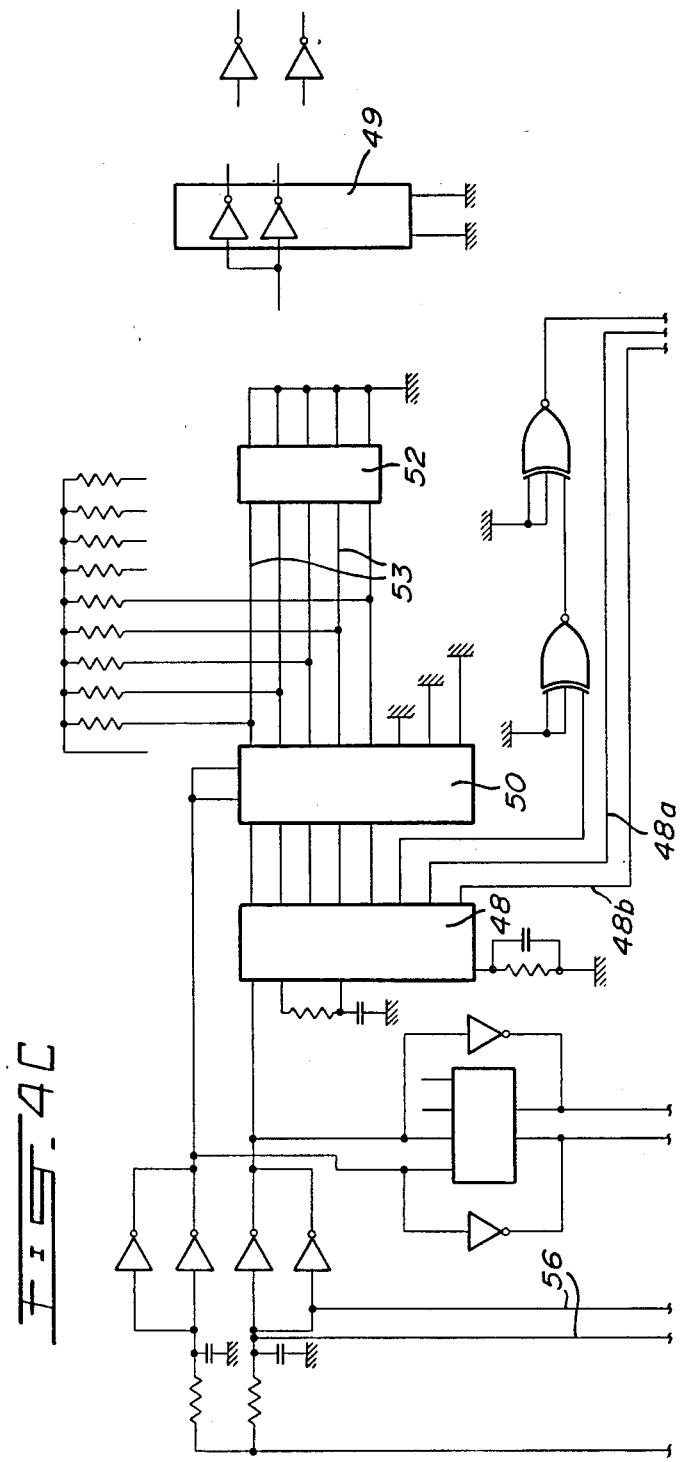

TEACHING SYSTEM USING COMPUTERS EQUIPPED WITH SCREENS AND CONNECTED IN A CLOSED LOOP WITH A TEACHER CONTROL STATION

BACKGROUND OF INVENTION

1. Field of Invention

The present invention relates to a teaching system comprising at least one, and preferably a plurality of computer stations having a computer device connected to a video monitor and which are controlled by an associated interface unit with all of the interface units in the system serially connected in a closed loop with a teacher controller device which conditions selected ones of the stations to operate in a selected mode with the controller displaying the selected mode to the teacher.

2. Description of Prior Art

Various computer teaching systems are known wherein a teacher station can condition various satellite student computer stations to operate in a selected mode. These student control stations may be in a classroom with the teacher control station, or the teacher control station may be physically located in a different room than the students. Also, some student stations could be located remotely from other student stations, but all controlled by the teacher control station. Such a system, for example, is disclosed in U.S. Pat. No. 4,538,993 issued on Sept. 3, 1985. In that particular system each student computer station is connected in parallel with other student computer stations and with a main switching console which connects into the teacher computer station. Also, the teacher station requires two video monitors, and namely, one to display transmitted information and one to display information received from various student stations.

A disadvantage of such a system is that it requires complex wiring and additional controller devices at each student station, thus resulting in an expensive and complicated system.

SUMMARY OF INVENTION

It is a feature of the present invention to provide a teaching system utilizing computers and which substantially overcomes the disadvantages of the prior art.

Another feature of the present invention is to provide a teaching system utilizing computers and wherein each of the student and teacher computer stations may be controlled by a teacher controller device which is serially connected with other interface units and which controls student and teacher stations by conditioning the interface units by a control network signal generated at the teacher controller and flowing through a closed loop interconnection of these interface units.

Another feature of the present invention is to provide a teaching system utilizing computers and which requires minimum wiring and control modules, thus making the system more affordable and easy to install.

Another feature of the present invention is to provide a teaching system utilizing computers and wherein the computer of any selected student or teacher station may operate as a source, in which case the monitor is still connected to the student or teacher computer, and wherein all of the video information in the computer or video monitor is available to any or selected monitors connected in the network, the selection being done by the control signal originating from the teacher controller.

Another feature of the present invention is to provide a teaching system utilizing computers and wherein the student and teacher stations are conditioned whereby its video monitor is disconnected from its computer (if one is provided) and becomes a receiver of video signals flowing in the closed loop network.

Another feature of the present invention is to provide a teaching system utilizing computers and wherein the student computer and teacher stations may be placed in an individual mode by the control signal where the computer and associated video monitor operates in the normal intended manner.

According to the broad features, from a broad aspect, the present invention provides a teaching system comprising a plurality of computer stations serially connected in a closed loop circuit. One of the stations is a teacher control station and the remaining stations are student computer stations. At least the student stations each comprises a computer device having an associated video monitor connected thereto via an interface unit. The teacher control station has a controller device connected between adjacent interface units of the teacher control station to transmit an information network signal in the loop circuit to condition all interface units to place its associated computer station to a preselected mode. A keyboard is associated with the controller device for selecting that mode. Visual indication means is also associated with the controller device to provide a visual indication at the control station of the selected mode. It is also pointed out that some of the student stations may not be provided with a computer.

BRIEF DESCRIPTION OF DRAWINGS

A preferred embodiment of the present invention will now be described with reference to the examples thereof as illustrated in the accompanying drawings, in which:

FIG. 1 is a block diagram of the computer teaching system of the present invention;

FIG. 2 is a block diagram of one form of realization of the interface unit;

FIG. 3 is a further block diagram of one form of realization of the teacher control system; and FIGS. 4A and 4C are detailed block diagrams of a slightly modified version of the interface unit of FIG. 2.

DESCRIPTION OF PREFERRED EMBODIMENTS

Figure 4A:
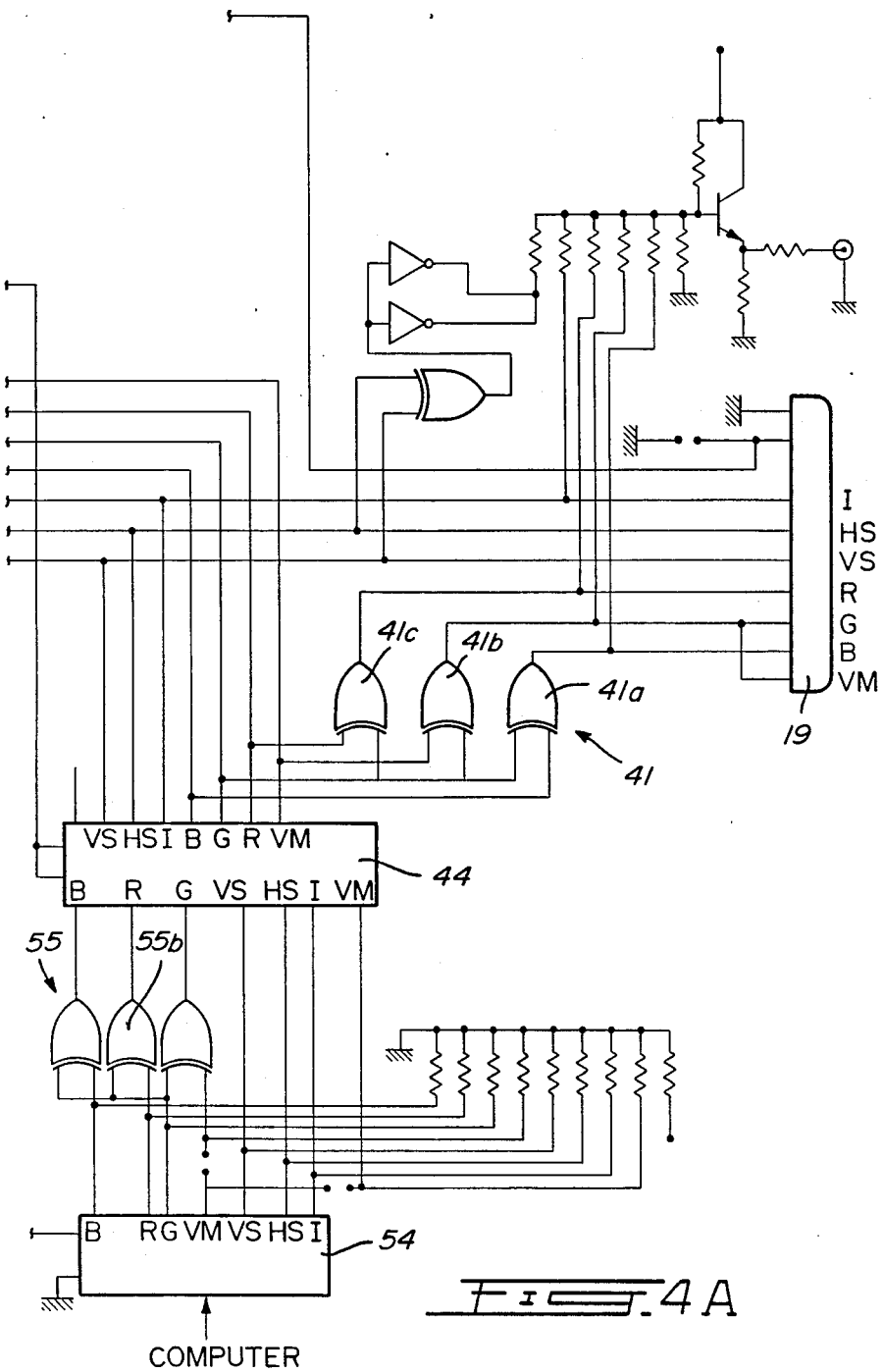

Referring now to the drawings, and more particularly to FIG. 1, there is shown generally at 10 the computer teaching system of the present invention and comprising a teacher controller device 14 which is serially connected with a plurality of computer stations 9 in a closed loop circuit 15.

Each computer station 9a, 9b, 9c, 9d or 9e comprises a computer device 12 and a video monitor 11 interconnected to one another through an interface unit 13. The output 8 of the controller device 14 is connected to a first cable 15a of the closed loop circuit 15 to interconnect it with the input 13a of the interface unit 13 of the first computer station 9a. This station 9a or station 9e is selected as the teacher station. Of course, the controller 14 may be connected elsewhere in the loop between any two interface units. The output 13b of interface unit 13 connects through another cable section 15b to the input 13a of the next interface unit 13 associated with student computer station 9b. Such interconnection continues throughout the loop by other cable sections 15c, 15e and 15f, and back to the input 7 of the controller device 14. The purpose of the controller 14 is to select a mode of operation for selected ones or all of the computer stations 11 in the closed loop network 15, and this is done by the teacher keying in the mode on a controller keyboard 26. By selecting the mode of operation for selected ones of the computer stations, a control signal is transmitted in the closed loop circuit cable 15 comprising a series of binary coded signals, and conditions the interface units 13 to interconnect their respective computers 12 and video monitors 11 to the selected mode after the address of the interface unit matches with the binary coded signals.

Referring now to FIG. 2, there is shown a block diagram of an interface unit 13 constructed in accordance with the present invention. The information network signal at the input 13a of the interface unit includes a video signal, a control signal and a supply. The purpose of the control signal is to condition the associated computer stations, herein 9a, 9b, 9c, 9d, 9e, to a selected mode of three possible modes, and namely (a) an individual mode, (b) a source mode, and (c) a target mode. The condition of the circuit is effected by a coded signal which is recognized by various switching means, herein constituted by buffer devices, to place the interface circuit to the selected mode corresponding to the coded control signal. The buffer 20 acts as an amplifier and feeds the binary coded signals to a decoder 21 where part of the code is matched with an identification address selected from the address circuit 22. If the part of the code matches with the identification address selected in the address circuit 22, a control circuit 23 places the buffers 16, 18, 24 and 25 to their required state depending on the mode selected by the coded signal that matched.

In the individual mode (a) the video signal is fed to the buffer circuit 16 where the signal is amplified and fed directly to the output 13b where it is connected by cable section 15b to the next interface unit in the serially connected loop. In this mode the video signal from the computer 12, associated with the interface unit 13 and connected at the input 17 of the interface unit, is amplified in the buffer circuit 18 and fed directly to the video output connection 19 whereby the video signals coming from the computer 12 are displayed on the associated video monitor 11. Buffers 16 and 18 constitute a first and second buffer circuit for this unit. In this particular mode a third and fourth buffer, namely buffer 24 and 25, are placed in a nonconductive mode thus acting as a switch in an OFF condition.

When the binary coded signal is such as to place the selected computer station 9a to a source mode (b), the control circuit 23 turns off the first buffer circuit 16 and also the third buffer 25, and turns on the second and fourth buffers 18 and 24. Thus, in this source mode the video output screen connection 19 and the computer input 17 are connected directly to the closed loop network cable 15 through the buffers 18 and 24. In this particular mode the selected computer station can be accessed directly and all of its computer video signals flow in the closed loop network cable 15 for inspection by any selected station placed in the target mode (c).

When the binary coded signal is such as to place the selected computer station 9a in the target mode (c), the control circuit 23 turns off the second and fourth buffers 18 and 24, and turns on the first and third buffers 16 and 25. In this particular mode the computer associated with the computer station 13 is disconnected and cannot send its video output on screen 11. The video screen is controlled by the teacher controller through the direct circuit connection from input 13a through buffer 16 and buffer 25. The screen can thus receive the video signals from the closed loop network.

As previously described, the network information signal at input 13a also includes a supply voltage which is of 12-volt DC and which is fed to a voltage regulator 40 (by proper wiring, not shown) where it is converted to 5-volt DC and utilized to supply the various circuits in the interface unit. A converter 41 may also be provided at the output of the buffer 18 or 25 to convert the video signal to a video composite signal if screen 11 is a composite video screen.

Referring now to FIG. 3, there is shown a block diagram of the teacher controller 14. This controller controls all of the interface units 13 in the closed loop network. As herein shown, the teacher controller is provided with a controller control circuit 28 which is conditioned by the keyboard 26 to effect the selected mode of operation for selected ones or all of the computer stations 9 in the closed loop network. A visual display 27 is also provided to display the modes of the computer stations. A central processing unit (CPU) 29 is connected to a random access memory (RAM) circuit 33 and a read only memory (ROM) circuit 32, and processes information to provide the control signal selected by the controller control circuit 28 as instructed by the keyboard 26. A decoder circuit 31 is associated with the RAM and ROM circuits 33, 32 and the CPU 29 to provide the CPU access to selected parts of the program in the RAM and the ROM. A demultiplexer circuit 30 is also associated with the CPU 29 and the controller control circuit 28 and connects to a latch circuit 34 which feeds the control signal to a transmitter device 35 which is connected to the output 8 of the teacher controller 14. When one of the computer stations 9 is in source mode (b), and sends a video signal into the closed loop network, and this video signal arrives at the input 7 of the teacher controller 14, it is amplified by buffer 36 and sent in the closed loop network at the output 8 of the teacher conroller 14. When one of the interfaces 13 recognizes the control signal sent by the teacher controller 14, it executes the requested operation as previously described by matching with its address codes. For example, the teacher controller can select a particular one of the computer stations and place it into a source mode and at the same time select another one or more of the computer stations and place it into a target mode whereby the station in the target mode will receive the video signal from the computer station placed in the source mode. The visual display 27 of the teacher controller displays the selected computer stations and the others are placed in the individual mode where they cannot have access to the video signal in the network.

Referring now to FIGS. 4A to 4C, there is shown a specific preferred construction of the interface unit 13. As herein shown, when the interface unit 13 is in the individual mode (a), the video signal from the computer, connector 17, is fed to the buffer 44 and through gates 55, is fed to device 43 and then to the connector 19a which connects to the video screen 11. Also, the signals from the buffer 44 and from devices 43, herein comprised of gates 41a, 41b and 41c, are fed to transistor circuit 42 to obtain a composite video signal output on terminal 19B where a screen 11 could be connected if it is of the video composite type. Buffer 45 is in an OFF state when the computer is connected directly to the monitor in the individual mode (a).

The output of buffer 44 is also connected to buffer 45 which can be conditioned to conduct in either direction. It acts more or less as a bidirectional switching circuit. Buffers 46 and 47 correspond substantially to buffer circuit 16 in FIG. 2 to connect the video signal at terminal 13a directly to the output terminal 13b. If, for example, the interface unit is conditioned to operate in its source mode (b), which is a transmission mode, the video signals from its associated computer and present on the computer terminal connector 17 pass through buffer 44 and appear on the monitor output terminal 19A and 19B. Also, these video signals pass through buffer 45, which is conditioned to pass these signals, and through buffers 46 and 47 which are connected to connector 13b which is the output of the interface unit. Thus, the video signals from this interface unit are transmitted within the network cable 15.

If the interface unit is in its target mode (c) where it conditions its circuits to receive video signals from the station placed in source mode (b), the video signals at the input connector 13a will pass through buffers 46 and 47 and then to buffer 45, all of which are conditioned to conduct the signals, and towards the video monitor output connector 19A and 19B. The buffer 44 will of course be conditioned to be closed. It is pointed out that I.C. 48 is a serial parallel converter, thus acting as a decoder. The control signals are transmitted by the teacher controller 14 in series and these signals pass through buffer 49 which is equivalent to buffer 20 in FIG. 2. These control signals are then fed to decoder 48 and buffer 50. Decoder 48 will decode the serial binary code to convert the bits into parallel and feeds I.C. 51 at its output connections 48a and 48b. This latter I.C. 51 acts as a latch which maintains in memory the code, as it is only sent for a short period of time by the teacher controller 14. Thus, the interface unit must record the code and keep it in memory until another code is sent. Switches 52 and buffer 50 acts as switches to permit the selection of the number or the address code of the interface. There are five connections 53 between buffer 50 and switches 52 which provide for thirty-two different combinations. Therefore, it is possible to connect up to thirty-two different interface units, and associated computer stations in a closed loop network.

Buffer 50 permits the switching on of the interface unit when the teacher controller transmits an "all" stations individual mode (a) code. Thus, all interface units switch to their individual modes (a). Accordingly, it is not necessary for the controller to send up to thirty-two different codes to condition the interface units to respond to this specific mode code.

The three gates 55 interconnected between the buffers 44 and converter 54 are gates which are integrated circuits, and these are utilized as demultiplexers of the video signals in order to reduce power consumption in the circuit. If, for example, an video signal is represented by RGB, the three colors usually oscillate simultaneously. In this particular circuit arrangement only the G (green) gate 55b would oscillate and reduce power consumption when the video signal is sent in the closed loop network. On the other hand, the gates 41 act as multiplexer to regenerate the video signal before it is sent to connectors 19.

As previously mentioned, the information network signal includes a 12-volt DC supply voltage and it is applied to the input connections 56 to connect same to the voltage regulator 40 to provide a regulated 5-volt DC output supply at terminal 57 whereby to supply the various component circuits of the interface unit. This main supply voltage is also fed back to the closed loop network on output connections 58 associated with output connector 13b.

It is within the ambit of the present invention to cover any obvious modifications of the preferred embodiment described herein, provided such modifications fall within the scope of the appended claims.

We claim:

1. A teaching system comprising a plurality of computer stations serially connected in a closed loop circuit, one of said stations being a teacher control station and the remaining stations being student computer stations, at least said student computer stations each comprising a computer device having an associated video monitor connected thereto via an interface unit, said teacher control station having a controller device connected between any two interface units of said student computer stations to transmit an information network signal in said loop circuit to condition selected interface unit to place its associated computer station to a preselected mode, and a keyboard associated with said controller device for selecting said mode, visual indication means associated with said controller device to provide a visual indication at said control station of said selected mode, said interface unit having a plurality of electronic switch means to condition its associated computer station to a predetermined mode selected from either an individual mode, a source mode or a target mode, said predetermined mode switching one or more interface units where address codes stored therein match with said predetermined mode, each said interface unit being interconnected through said single main cable bridging said interface units for communication with designated interface units, said cable originating from an output of said teacher controller device and terminating at an input thereof.

2. A teaching system as claimed in claim 1 wherein said information network signal is comprised of a control signal and a video signal, and a voltage supply line interconnected in a single main cable loop carrying said information network signal.

3. A teaching system as claimed in claim 1 wherein said plurality of switch means are buffers interconnected between a main cable input, a main cable output, a computer device input and video device output; said buffers being placed in a predetermined state by said predetermined mode signal in said control signal.

4. A teaching system as claimed in claim 3 wherein said interface units further comprise a decoder circuit connected to a control circuit, an address circuit connected to said decoder circuit to provide predetermined address codes for said decoder to compare with said predetermined mode signal in said control signal to identify the mode of operation of said control circuit when an address code matches with said predetermined mode signal.

5. A teaching system as claimed in claim 4 wherein said interface units further comprise a first buffer connected to said main cable input and conditioned for redirecting said video signal to said main cable output, a second buffer conditioned to interconnect said computer device input of said interface unit to said video monitor output of said interface unit when said first buffer is conductive in said individual mode, a third and a fourth buffer being also turned off.

6. A teaching system as claimed in claim 5 wherein when in said source mode said control circuit turns off said first buffer and a third buffer connected between an output of said first buffer and said video device output, said control circuit also turning on said second buffer and a fourth buffer connected between said computer device input and said main cable output whereby all computer device video signals of that selected student or teacher computer station are sent through the network on said main cable.

7. A teaching system as claimed in claim 6 wherein when in said target mode said control circuit turns off said second and fourth buffers and turns on said first and third buffers whereby said video signal is connected directly to said video screen output and also said main cable output, said computer input being isolated by said second and fourth buffers.

8. A teaching system as claimed in claim 4 wherein a fifth buffer interconnects said main cable input to said decoder circuit and to said main cable output, said fifth buffer amplifying said control signal.

9. A teaching system as claimed in claim 3 wherein a voltage regulator circuit is connected to said main cable input, said voltage supply being converted by said regulator to supply the circuit voltage for operation of circuits in said interface unit.

10. A teaching system as claimed in claim 1 wherein said visual indication means is comprised of four distinct display elements; memory circuit means, address circuit means and processing means responsive to a controller control device conditioned by said keyboard and interacting with processing means for producing said control signal selected by said keyboard and corresponding to said predetermined mode, and a transmitter for transmitting said control signal into said closed loop circuit.

11. A teaching system as claimed in claim 10 wherein said memory circuit means comprises a RAM (random access memory) and a ROM (read only memory) circuit connected to said processing means constituted by a CPU (central processing unit), said address circuit having a decoder and being connected to said CPU to address said memory circuit means.

12. A teaching system as claimed in claim 10 wherein said output and said input of said teacher control station are interconnected through a buffer circuit which amplifies said video signal received on said input and reconnects it to said output and back into said closed loop.

* * * * *